United States Patent
Willson et al.

(10) Patent No.: US 10,579,966 B1
(45) Date of Patent: Mar. 3, 2020

(54) ADAPTING A SHARED PROJECT BUILD PLATFORM TO A DEVELOPER PLUGIN

(71) Applicant: INTUIT INC., Mountain View, CA (US)

(72) Inventors: Michael Willson, Mountain View, CA (US); Velu Ganapathy, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 145 days.

(21) Appl. No.: 15/192,046

(22) Filed: Jun. 24, 2016

(51) Int. Cl.
G06F 9/44 (2018.01)
G06Q 10/10 (2012.01)
G06F 8/30 (2018.01)
G06F 8/60 (2018.01)

(52) U.S. Cl.
CPC ............ *G06Q 10/103* (2013.01); *G06F 8/30* (2013.01); *G06F 8/60* (2013.01)

(58) Field of Classification Search
CPC ...................................................... G06F 8/30
See application file for complete search history.

(56) References Cited

U.S. PATENT DOCUMENTS

| | | | | |
|---|---|---|---|---|
| 7,827,548 B1 * | 11/2010 | Anderson | ................ | G06F 8/71 717/174 |
| 9,547,564 B1 * | 1/2017 | Troutman | ................ | G06F 8/61 |
| 9,703,550 B1 * | 7/2017 | McCann | ............. | G06F 9/44505 |
| 2003/0149970 A1 * | 8/2003 | Shanbhogue | ........... | G06F 8/656 717/170 |
| 2006/0212857 A1 * | 9/2006 | Neumann | ................. | G06F 8/20 717/140 |
| 2007/0143228 A1 * | 6/2007 | Jorden | .................... | G06F 21/10 705/71 |
| 2008/0092234 A1 * | 4/2008 | Circenis | ............. | G06F 21/6218 726/21 |
| 2015/0106791 A1 * | 4/2015 | Karuppiah | .......... | G06F 11/3688 717/127 |
| 2015/0261518 A1 * | 9/2015 | Viswanathan | ............ | G06F 8/71 717/168 |

* cited by examiner

*Primary Examiner* — Hang Pan

(74) *Attorney, Agent, or Firm* — Patterson + Sheridan, LLP

(57) ABSTRACT

The present disclosure relates to building a software development project using a shared build module common to development projects targeting a specific software platform. According to one embodiment, a development system receives a request to build the software development project. A development system evaluates a configuration file for a shared build module for one or more build parameters. The build parameters generally specify one or more modifications to apply to the shared build module. The development system modifies operating parameters for the shared build module based on the parameters in the configuration file and builds the software development project using the modified shared build module.

17 Claims, 6 Drawing Sheets

ADAPTING A SHARED PROJECT BUILD PLATFORM TO A DEVELOPER PLUGIN

BACKGROUND

Field

Embodiments presented herein generally relate to building and deploying software projects, and more specifically to using common, or shared, build modules to build and deploy different development projects targeting a common software platform.

Description of the Related Art

In software systems that support the development of plugins (i.e., programs that interact with and use features exposed by the software system), development teams may independently develop these plugins. However, such development teams may use similar code to build and deploy plugins for testing and/or public release. The build/deployment code bases used for building, testing, and deploying plugins may include, for example, code to enable unit testing, measure an amount of the development project covered by such unit testing, and so on. Over time, the build/deployment code bases used by different development teams may diverge as independent teams customize build code for specific problems that arise in the context of building a specific "plugin" for the software system.

To maintain different code bases for building and deploying software plugins, independent development teams may duplicate the work of other development teams to perform update their respective build/deployment code bases as the platforms targeted by these plugins change. The platforms may include, for example, application programming interfaces (APIs), software development kits (SDKs), and so on. Further, build/deployment code bases may, over time, diverge for different developer teams and/or projects. As a result of this divergence, updated code for one build/deployment code base may not work or may break other functionality in a different build/deployment code base. To propagate changes to build/development code bases across various development teams, each code base may need to be independently changed and tested to verify that changes to the build/development code base provide the expected functionality and does not break other functionality.

SUMMARY

One embodiment of the present disclosure provides a method for building a software development project. The method generally includes receiving a request to build the software development project. A development system evaluates a configuration file for a shared build module for one or more build parameters. The build parameters generally specify one or more modifications to apply to the shared build module. The development modifies operating parameters for the shared build module based on the parameters in the configuration file and builds the software development project using the modified shared build module.

Another embodiment provides a computer-readable medium having instructions which, when executed on one or more processors, performs an operation for building a software development project. The operation generally includes receiving a request to build the software development project. A development system evaluates a configuration file for a shared build module for one or more build parameters. The build parameters generally specify one or more modifications to apply to the shared build module. The development modifies operating parameters for the shared build module based on the parameters in the configuration file and builds the software development project using the modified shared build module.

Still another embodiment of the present disclosure provides a system including a processor and a memory storing a program which, when executed by the processor, performs an operation for building a software development project. The operation generally includes receiving a request to build the software development project. A development system evaluates a configuration file for a shared build module for one or more build parameters. The build parameters generally specify one or more modifications to apply to the shared build module. The development modifies operating parameters for the shared build module based on the parameters in the configuration file and builds the software development project using the modified shared build module.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
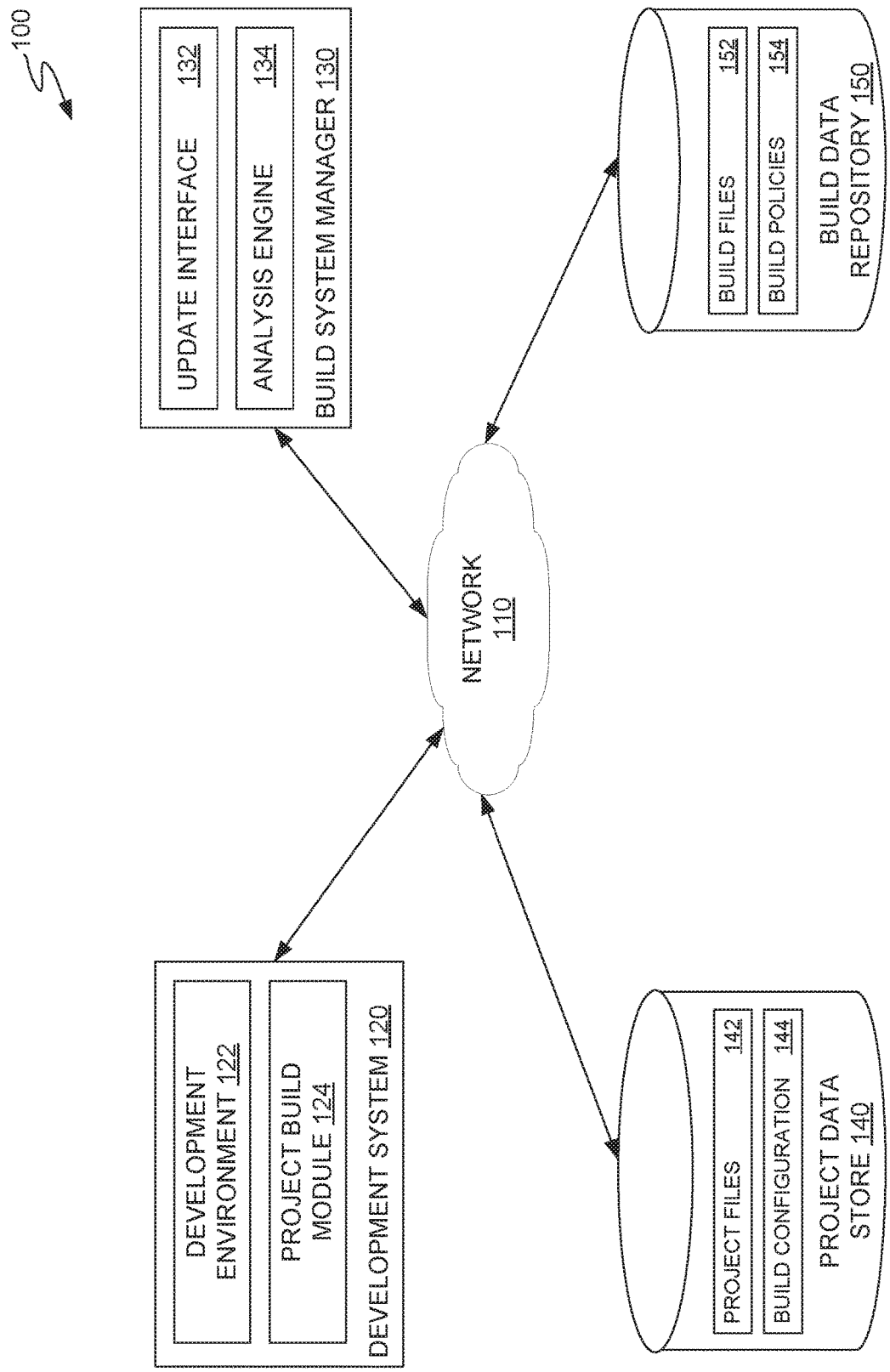
FIG. 1 illustrates an example computing environment, according to one embodiment.

Applications and frameworks that allow developers to add functionality to an application (e.g., via application plugins) constantly change. These changes may include, for example, new functionality added to an API, deprecation of functionality introduced in previous versions of an API, modifications to existing APIs, and so on.

To build plugins, development teams generally use a set of project build commands to compile, test, and deploy plugins for use in production systems. The build commands may indicate, for example, portions of plugin code to subject to unit testing, libraries to include (or reference) at compile time, and so on. In a system where independent development teams develop plugins for the same application, the build commands used by those teams may gradually diverge to accommodate the needs of each development team.

Over time, each development team may need to update their build code to reflect changes in the target application (e.g., as APIs are updated). To update the build code, developers may periodically receive information with instructions on how to update the build code, for example, as a weekly e-mail. The instructions may, for example, include information indicating that development teams should migrate away from specified build functions or APIs and so on. Because independent development teams may use different sets of build/deployment code, developers that maintain the build/deployment modules may spend a significant amount of time aiding development teams in debugging different sets of build/deployment code that perform the same or similar tasks.

Embodiments presented herein provide techniques for centralizing a build/deployment platform (e.g., architecture and build code) and deploying the common build/deployment platform to development teams that build plugins for a common software platform. Using a centralized build/deployment platform may allow for the use of a single set of build/deployment code across development teams instead of building the build/deployment code base for each development project. By providing development teams with a common build/deployment platform, the developers of the common build/deployment platform can maintain control over and consistency in the build/deployment code used across development teams that build plugins or extensions for a common software platform. A single development team may be responsible for maintaining the build/deployment code across various development teams that develop plugins or extensions for the common software platform, which allows development teams to focus on building plugins, instead of maintaining and updating the code to build, test, and deploy plugins. The build/deployment platform may allow development teams to customize the build/deployment platform with modifications that are specific to a specific plugin or development team. The shared build/deployment platform may also allow developers on different development teams to contribute features to the build/deployment platform for use across development teams.

In some cases, maintaining the common build/deployment platform includes a mechanism for automatically updating the build/deployment code used by a development team to the most recent version of the build/deployment code. Automatically updating build/deployment code across development teams ensures consistency in the build/deployment code used for building plugins for a common software platform. In some cases, the automatic updates may notify developers of changes to the common software platform and the build/deployment code, such as deprecated functions or the addition of new functionality to the software platform. Over time, updates to the common build/deployment platform may force developers to migrate away from deprecated functionality by automatically updating the copy of the build/deployment platform code used by a development team to a more recent version.

FIG. 1 illustrates an example networked computing system for maintaining a common build platform for developing plugins or extensions to a software platform, according to one embodiment. As illustrated, computing system 100 includes a development system 120, build system manager 130, project data store 140, and build data repository 150, connected via network 110.

A plurality of development systems 120 may be used by different development teams to build plugins for a common software platform. To enable development teams to build plugins for a common software platform, each development system 120 may be configured to download, from a centralized repository, a shared build module to use for building plugins for the common software platform. By using the same shared build module on each development system 120 used to develop plugins for the common software platform, each development team may use the same (or substantially the same) build/deployment code instead of building unique build/development code bases that need to be independently updated as the underlying common software platform changes.

As discussed herein, development systems 120 may be configured to continually update a local copy of the shared build module to ensure that different development teams use the same shared build module for building and deploying plugins. Over time, as updates are released for the software platform (and corresponding updates are released for the shared build module), policies associated with the shared build module may force plugin development teams to migrate to up-to-date versions of the shared build module.

As illustrated, development system 120 generally includes a development environment 122 and a project build module 124. Generally, development environment 122 includes an editing interface and an interface to invoke project build module 124 on a software development project loaded in development environment 122. The editing interface generally provides a graphical interface that allows software developers to access, create, edit, and test source code components in a development project. Source code components include source code files, modules, functions, libraries, or portions thereof that can be viewed and/or edited in development environment 122. Developers may, in some cases, obtain source code files to edit from a networked data store, such as project files 142 in project data store 140. As developers write and test code, developers can commit new source code files and modifications to existing source code files to project files 142 in project data store 140.

In some cases, development environment 122 may additionally provide an interface in which developers can edit a configuration file used by project build module 124 to build and/or deploy the development project using the shared build module used by development teams that build plugins for a common software system. The configuration file may be, for example, a text file that project build module 124 can parse to determine what features provided by the shared build module are to be used in building and deploying the plugin or extension under development on development system 120. In some cases, development environment 122 may provide a graphical interface that presents each of the optional features provided by the shared build module to a developer and graphical user interface components (e.g., radio buttons, on/off toggles, check boxes, and so on) that a developer can use to activate or deactivate optional features.

Development environment 122 additionally may provide a debugging interface in which developers can test code before building a version of a development project for release (e.g., as an internal test version, private beta version, or a public release). The debugging interface may allow developers to compile and execute a debug version of the development project. To aid in debugging the development project, the debugging interface in development environment 122 generally allows developers to set breakpoints in various locations in the source code components of a development project to temporarily halt execution of the program. The debug environment may also present one or more graphical interfaces to display the values and states of variables in an executing subroutine or method, stack traces illustrating the program execution path that resulted in execution of a particular line of code, and so on. In some cases, the debug interface may allow developers to perform line-by-line execution of a program executing in the debugging interface.

Project build module 124 generally obtains a shared build module from a centralized repository (e.g., build data repository 150) to use in building and deploying a software development project under development in development system 120. The software development project may be, for example, a plugin that extends the functionality of a specific software platform, and the shared build module may be build/deployment code used by all developers targeting the specific software platform. Generally, when a developer invokes project build module 124 (e.g., through development environment 122, a command line tool, and so on), project build module 124 may download a copy of the shared build module to development system 120 (if a local copy does not exist) and begin a project build process according to a build configuration file for the development project. In some cases, project build module 124 retrieves the shared build module from build data repository 150 using a package manager (e.g., npm).

The shared build module for plugins targeting a specific software platform generally includes scripts, utilities, and configurations that may be commonly used by development teams that develop plugins for a specific software platform. For example, the shared build module may include scripts for building (e.g., compiling and linking) a development project, generating test servers (e.g., for debug purposes), executing tests on the compiled development project (e.g., unit testing), integrating the compiled development project for use with the specific software platform, and so on. The scripts included for executing tests on the compiled development project may include, for example, scripts to measure the amount of code in the development project that is covered by unit testing.

In some cases, the shared build module may also include scripts or utilities for tracking errors in the compiled development project that may arise, for example, during unit testing or execution of other test scripts included in the. For example, the error tracking scripts may generate log files that save the execution state of the program or plugin (e.g., active function, line(s) of code and/or the name of the API function that generated an error, variable state, and so on). The scripts may periodically transmit the log files to build system manager 130 for further analysis (e.g., to identify popular API functions that cause a large number of errors across plugins).

In some cases, the shared build module may include scripts for tracking API usage in a development project. The API tracking scripts may, for example, search source code files for the development project to find deprecated APIs used in the development project. The scripts may generate a list of deprecated APIs, a frequency of usage, and so on, save the data as a log file on development machine 120, and transmit the log files to build system manager 130 for further analysis.

In some cases, project build module 124 may compare version information of the local copy of the shared build module (if one exists) to version information for the most recent shared build module available in build data repository 150. A major update may introduce new functionality to the build module, deprecate previously supported build module functions, break functionality supported in a previous version of the shared build module, and so on. A patch update may, for example, represent bug fixes to the shared build module (e.g., to provide the expected functionality exposed by a function in the shared build module), and a minor update may add new functionality that is backwards compatible with previous versions of the shared build platform. Because minor and patch updates may not break the expected functionality of the shared build module, project build module 124 may replace any local copies of the shared build module on development system 120 with the latest minor or patch update of the shared build module from build files 152 at build data repository 150. However, because major updates may break the expected functionality of the shared build module (or functions in the shared build module), project build module 124 may not automatically replace an existing version of the shared build module with a downloaded major version update to the shared build module.

In some cases, when project build module 124 requests data about the current version of the shared build module, project build module 124 may additionally receive information about updates to the shared build module (e.g., a change log associated with each update to the shared build module). The updates may be, for example, textual data that describes the changes to the most recent shared build module relative to the version of the shared build module stored at development system 120. In some cases, such as when a major update is available for download from build data repository 150, the textual data may inform a user that a major update to the shared build module is available. In some cases, the textual data may further inform the user that the current version of the shared build module will not be supported after a set amount of time (e.g., as a countdown timer to the last day that the current version of the shared build module will be supported).

In some cases, updates to the shared build module may update a version of the APIs used by a plugin to interact with an application (e.g., add functionality to an application, use data generated by an application, and so on). New versions of an API may introduce expanded functionality relative to a previous version of the API and may deprecate (or remove) functionality that is not commonly used, did not work properly (e.g., did not provide the expected functionality), posed a security risk, and so on. The notification data received by project build module 124 in response to a request for information about the current version of the shared build module may thus, in some cases, include data about the APIs used by the plugins to interact with an application.

In some cases, project build module 124 may use the data from build data repository 150 to block a developer from building and deploying a plugin using a deprecated shared build module (and/or deprecated APIs or functions in an API). For example, during compilation, project build module 124 can execute one or more scripts included in the shared build module to scan the source code for a software development project to determine if the project source code includes any references to deprecated APIs or API functions. If the project source code does include references to deprecated APIs or API functions, project build module 124 can notify the user of development system 120 that the project source code uses deprecated APIs or API functions. In some cases, project build module 124 may block a user of development system 120 from deploying a compiled version the software development project until the development team replaces the deprecated APIs or functions used in development project source code with supported APIs or functions. In some cases, if the changelog includes data identifying deprecated functions in a specific version of the shared build module and suggested replacements for those deprecated functions, project build module 124 can display a notification to the user to suggest replacements to the identified APIs or functions in the project source code or automatically replace deprecated functions with the suggested replacement functions.

In some cases, project build module 124 can calculate an amount of code covered by unit tests to determine if the software development project is sufficiently tested. The shared build module, in some cases, may define a minimum level of code coverage that project build module 124 can use to determine if the software development project is sufficiently tested. If the amount of code coverage for the software development project exceeds the minimum level of coverage, scripts in the shared build module may allow project build module 124 to build and deploy the software development project (e.g., build and deploy a plugin). If the amount of code coverage for the software development project is less than the specified minimum level of coverage, scripts in the shared build module may notify a user of development system 120 that the amount of code coverage is less than the specified minimum. In some cases, scripts in the shared build module may allow project build module 124 to compile the software development project for testing, but block developers from deploying the software development project to a production environment until the amount of code tested on development system 120 exceeds the specified minimum.

Build system manager 130 generally allows developers of the shared build module for a specific software platform to commit updates to the shared build module to a repository (e.g., build data repository 150) and analyze data received from one or more development systems 120 (e.g., from different development teams) to identify problems in APIs and/or the shared build module. Updates committed to the repository via build system manager 130 are generally propagated to each development system 120 when a user initiates a build/deployment operation at a development system 120. Over time, use of previous versions of a shared build module can be phased out as developers initiate build/deployment operations (which replace a previous version of the shared build module with an updated version of the shared build module) at individual development systems 120. As illustrated, build system manager 130 generally includes an update interface 132 and an analysis engine 134.

Update interface 132 generally allows developers of the shared build module for plugins targeting a specific software platform to commit changes to the shared build module to a centralized repository (e.g., build files 152 in build data repository 150). Update interface 132 may include a versioning system to increment the version data associated with the updated shared build module based, for example, on a number of changes to the updated shared build module relative to the previous version of the shared build module. In some cases, the versioning system may allow a user to manually designate the updated shared build module as a major update (which, as discussed above, project build module 124 can, but need not, automatically download) or a minor or patch update (which, as discussed above, project build module 124 may automatically download).

Update interface 132 may, in some cases, allow a user to commit a changelog or other update notes to build data repository 150 when the user commits an updated version of the shared build module to build data repository 150. The changelog, as discussed above, may identify changes to functions in an API or the shared build module, bug fixes, deprecated functions, and so on. Update interface 132 may allow a user to commit the update notes concurrently with an update to the shared build module.

In some cases, update interface 132 may allow a user to define an update policy for the updated shared build module. The update policy may define, for example, an amount of time from the date of the update that previous versions of the shared build module will be supported. In some cases, the build policies may additionally include parameters such as a minimum level of code covered by test procedures (e.g., unit tests), required parameters to execute build and deployment procedures, and so on.

Analysis engine 134 may receive data from various development projects (e.g., from project build module 124 at various development systems 120) identifying, for example, API functions invoked by development projects, shared build module functions invoked during build/deployment operations, errors encountered while compiling or testing a software development project, and so on. Based on the data received from the various development systems 120, analysis engine 134 can identify API usage trends across the various development teams working on plugins for a software application. The API usage trends may identify, for example, popular APIs, APIs that cause compilation and/or runtime errors, and so on. Based on the usage trends identified by analysis engine 134, developers supporting the shared build modules and/or the APIs targeted by plugin developers can focus development efforts on optimizing popular APIs and fixing bugs in APIs that analysis engine 134 identifies as sources of a large number of build and/or runtime errors.

Project data store 140 generally provides a repository in which development teams can store source code files, build configuration files, and so on. As illustrated, project data store 140 generally includes project files 142 and build configuration 144.

Project files 142 may be, for example, a code versioning system that allows users to access, check out, and commit versioned changes to source code files via development environment 122. Project files 142 may include source code files, graphical user interface elements used in a software development project, debug files, and so on. Over time, as developers test and deploy versions of a software development project, developers can designate particular versions of the project source code as milestones (e.g., designating source code corresponding to a public release as a milestone). Developers may subsequently roll back source code changes to a previous milestone, which allows developers to change code without losing or overwriting previously working code.

Build configuration 144 generally stores one or more files used by project build module 124 to build and deploy a software development project. As discussed above, the configuration files generally define how a software development project interacts with the shared build modules to build, debug, and deploy a software development project. For example, the build configuration files may include values associated with mandatory parameters for the shared build module (e.g., where to store and/or execute a compiled version of the software development project, whether the build is for debug or production purposes, and so on). The build configuration files may additionally include parameters indicating whether or not project build module 124 is to build the software development project using optional features supported by the shared build module. As the shared build modules expose new features, the build configuration files may be updated to reflect the new features. By default, the build configuration files may be updated to instruct project build module 124 to not use the new features, and a developer may overwrite the defaults by editing a build configuration file in development environment 122 and committing the edited build configuration file to build configuration 144.

Build data repository 150 generally provides a centralized repository for the shared build module, as discussed above. As illustrated, build data repository 150 generally includes build files 152 and build policies 154.

Build files 152 generally include the build scripts, utilities and configuration files associated with each version of a shared build module. In some cases, build files 152 may be a versioning system in which an archive of the build scripts, utilities, and configuration files are associated with release notes for that version of the shared build module.

Build policies 154 generally include policies associated with each version of the shared build module stored in build files 152. The policies may include, for example, an amount of time that the development team for the shared build module will support previous versions of the shared build module, whether version updates are mandatory or optional, and so on. For example, developers of the shared build module can designate critical fixes (e.g., bug fixes, security patches, and so on) to the shared build module and/or APIs as mandatory updates, while updates to the shared build module that add functionality or break expected functionality may be designated as optional updates for a set amount of time. In some cases, build policies 154 may include thresholds for an amount of code test coverage and whether developers can deploy, to production systems, code that falls below the defined thresholds.

Figure 2:
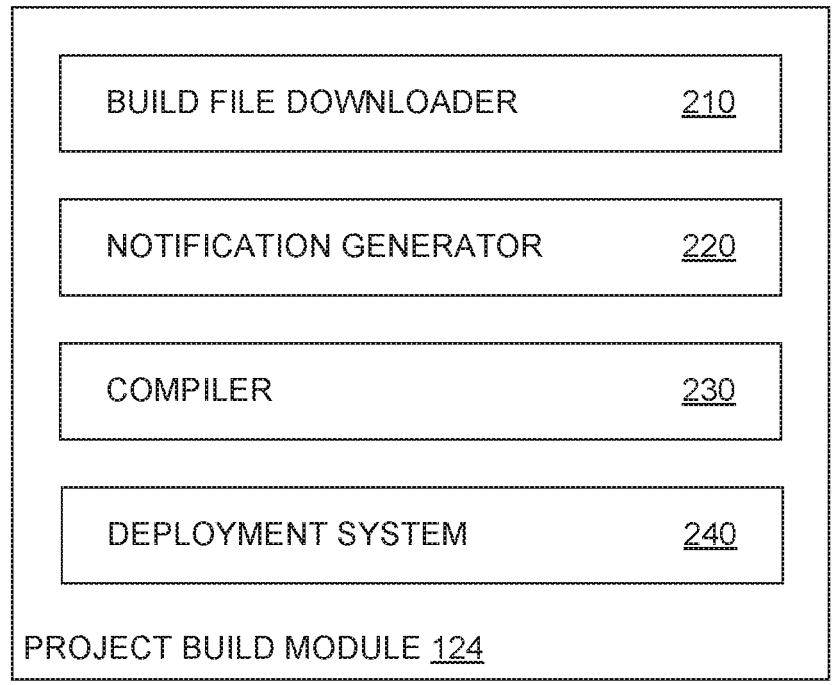
FIG. 2 illustrates an example project build module, according to one embodiment

FIG. 2 illustrates an example project build module 124, according to an embodiment. As illustrated, project build module 124 generally includes a build file downloader 210, notification generator 220, compiler 230, and deployment system 240.

When a user invokes project build module 124 (e.g., through a compile command in development environment 122 or using a command line tool), build file downloader 210 is generally configured to query a centralized build module repository (e.g., build data repository 150) for version information associated with the most recent version of the shared build module. If build file downloader 210 determines that a stored version of the shared build module is older than the most recent version of the shared build module, build file downloader 210 may determine whether or not to download the most recent version of the shared build module based, for example, on a build module update policy at development system 120 or whether the most recent version of the shared build module is designated as a patch update, a minor update, a major update, and/or a mandatory update.

For minor or patch updates to the shared build module for projects targeting a specific software platform (e.g., updates that are backwards compatible with previous versions of the shared build library), build file downloader 210 may automatically download the shared build module from build data repository 150 after a developer invokes project build module 124. By downloading an updated version of the shared build module from build data repository 150, changes to the build/deployment code used to build a plugin may be applied automatically at the local development system (e.g., development system 120) without requiring a developer to manually update the build code used on development system 120. In some cases, however, if a build configuration for a particular software development project specifies that the software development project is tied to a specific version of the shared build module, build file downloader 210 need not download the most recent version of the shared build module. If the update to the shared build module, however, is designated as a mandatory update, build file downloader 210 can download the updated shared build module and cause notification generator 220 to display a notification to the user of development system 120 that a project build module 124 downloaded mandatory update to the shared build module.

For major updates, build file downloader 210 need not automatically download the shared build module from build data repository 150 when a developer invokes project build module 124. In some cases, build file downloader may compare the current date to the expiration date associated with a previous major version of the shared build module to determine whether to force migration to the new major version of the shared build module. For example, if the current date is before the expiration date of the previous major version of the shared build module, build file downloader 210 may request that notification generator 220 display a notification to users of development system 120 of the impending migration to a new version of the shared build modules. If the current date is after the expiration date of the previous major version of the shared build module, build file downloader may replace the previous version of the shared build module on development system 120 with the major update to the shared build module. Build file downloader 210 may also request that notification generator 220 display a notification to a user that project build module 124 has downloaded a major update to the shared build module.

In some cases, a downloaded version of the shared build module may also include release notes identifying changes to the shared build module relative to a previous version of the shared build module. If a downloaded version of the shared build module includes these release notes, build file downloader 210 may provide the release notes to notification generator 220 for display to a user of development system 120.

Notification generator 220 is generally configured to display information about the shared build modules to a user of development system 120 (e.g., as pop-up windows, e-mail notifications, and so on). Notification generator 220 generally receives data to display from build file downloader 210. The data to display may include, for example, expiration dates associated with a previous version of the shared build module, availability of an updated version of the shared build module, changes to the shared build module relative to a previous version of the shared build module, and so on. In some cases, notification generator 220 can receive data to display with a specified method of displaying the data to a user of development system 120. For example, notification generator 220 can e-mail or display in a window of development environment 122 change logs associated with a minor or patch update of the shared build module (e.g., an update that adds functionality to the shared build module or fixes bugs in the shared build module and is backwards compatible with previous versions of the shared build module). For other notifications, such as an impending expiration of a version of the shared build module, notification generator 220 can be configured to generate a more intrusive and visible notification, such as a pop-up window. In some cases, notification generator 220 can display critical notifications in a pop-up window (or similar container) that a user must acknowledge before project build module 124 compiles a software development project.

Compiler 230 is generally configured to build a software development project into executable code using the downloaded shared build modules. As discussed, the shared build module used by compiler 230 to build and deploy a software development project generally includes a common code base used by other development teams to build and deploy a software development project. Compiler 230 can use the shared build module for a specific software platform without requiring that a developer manually generate and/or update the build/development code for a specific software development project. As the shared build module is updated, the project build module 124 can download an updated version of the shared build module from a central build repository when a developer invokes project build module 124 to build a version of the software development project without requiring that a developer manually update the build/development code to reflect changes in the software platform.

In some cases, when a developer invokes project build module 124 and after build library downloader 210 downloads updates to the shared build library (if needed), compiler 230 may run one or more pre-build check scripts included in the shared build library to determine if the project is valid and can be built. The pre-build check scripts may include, for example, scripts for checking for code syntax errors, whether the source code invokes nonexistent functions (either in an API or project source code), and so on. If one of the pre-build check scripts generates a failure, compiler 230 can notify a developer that the development project will not build successfully and discontinue the build process.

If the pre-build check scripts execute successfully, compiler 230 can execute the build process to generate a deployable version of the software project. The build process may include code compilation (for projects built using languages that do not support just-in-time compilation during code execution), file modification, moving files to a destination directory, and so on. In some cases, during the build process, compiler 230 can execute one or more build tests (e.g., unit tests) to verify that the software development project works as intended, and so on.

After executing the build process, compiler 230 can run one or more post-build tasks related to the build process. In some cases, the post-build tasks may include aggregating metrics for the software development project (e.g., API usage, numbers of warnings generated during compilation, and so on), performing build checks, and so on. Upon aggregating metrics for the software development project, compiler 230 can report the metrics to a user of development system 120 and transmit the report to a build system manager 130 for further analysis (e.g., of metrics aggregated across multiple development projects targeting the same software platform). The build checks may, for example, include executing one or more automated tests to simulate real-world usage of the program to ensure that the built software development project executes correctly.

In some cases, compiler 230 may be configured to use a first set of build scripts to build a software development project for debugging purposes, and a second set of build scripts to build the software development project for public release. The build scripts used for debugging a software development project may include scripts for generating a compiled version of the software development project with debug flags enabled (e.g., to allow a user to pause testing and perform line-by-line execution of the source code), generating a variety of tests against the code of the software development project, measuring an amount of code covered by the tests, and so on. In some cases, compiler 230 may record an amount of code test coverage to determine whether the amount of test coverage meets or exceeds a threshold amount of code coverage defined in the shared build module. If the amount of code coverage does not meet the threshold amount of code coverage, compiler 230 may request notification generator 220 to display a message on development system 120 to inform the user that the software development project does not meet the required code coverage.

If a developer invokes project build module 124 to build a version of the software development project, compiler 230 can use the second set of build scripts to generate a deployable version of the software development project. The second set of build scripts may, for example, remove test code from the project source code during the build process and generate a deployable version, which may not include, for example, debug flags or other debug tools. In some cases, the build scripts for building a deployable version of the software development project may include code refactoring scripts or other scripts to optimize the performance of the deployable version of the software development project.

Deployment system 240 is generally configured to receive a deployable version of the software development project from compiler 230 and make the deployable version available for public use. In some cases, deployment system 240 may use information in a build configuration file to transfer a deployable version of the software development project to a production system identified in the build configuration file. In some cases, the build configuration file may also include information identifying a date and time at which the deployable version can be made available for public use. Deployment system 240 can use such information to determine when to transfer the deployable version of the software development project to an identified production system to make the deployable version available for public use at the identified date and time.

Figure 3:
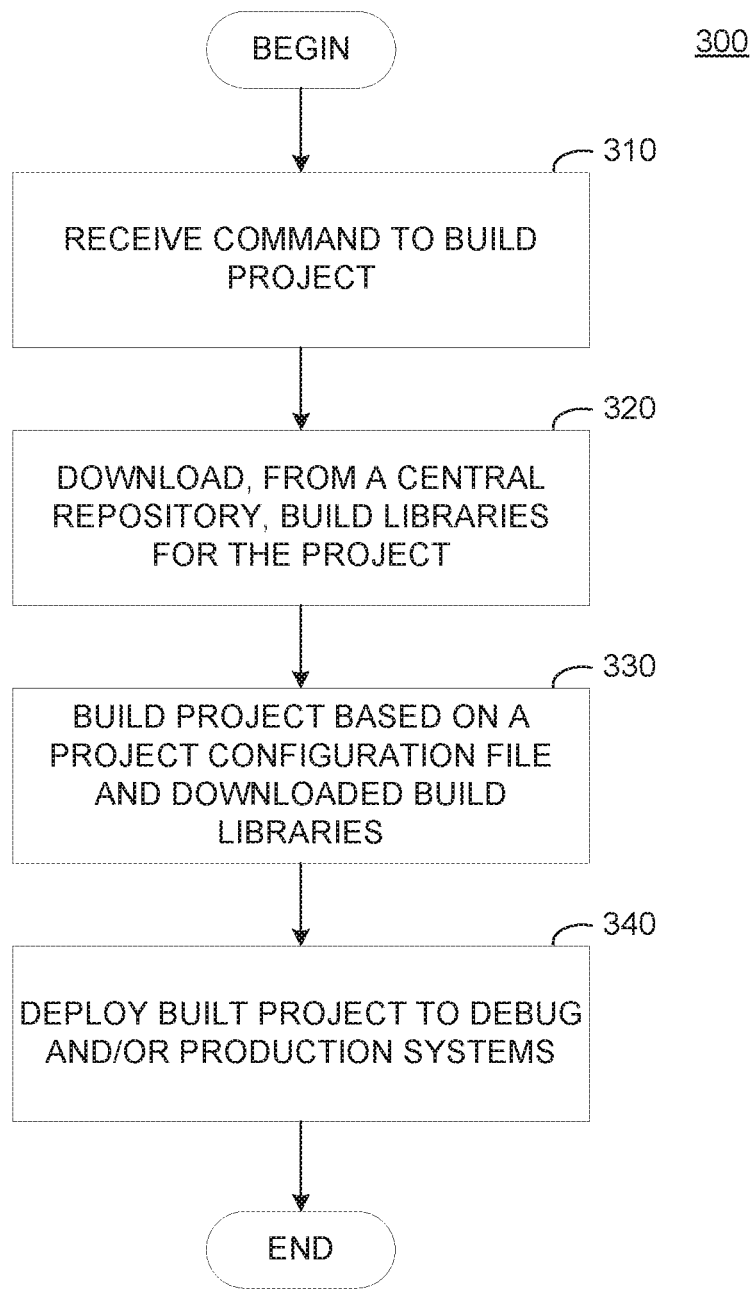
FIG. 3 illustrates an example method for building a software development project using a shared build module, according to one embodiment.

FIG. 3 illustrates example operations 300 that may be performed, for example, by project build module 124 to build a software development project using a shared build module, according to an embodiment. Generally, the shared build module includes build code associated with a specific software platform and may be managed (e.g., updated) by a developer of the software platform. Plugin developers need not maintain build code, as the use of a shared build module may ensure that the same build code is used by developers that build plugins for a specific software platform.

As illustrated operations 300 begin at step 310, where the project build module 124 receives a command to build a software development project. Project build module 124 may receive the command from development environment 122 (e.g., an integrated development environment), a command line interface, and so on. The command to build the software development project may include, for example, flags indicating if the build is for debugging or deployment, optimization flags, and so on.

At step 320, project build module 124 downloads, from a central repository, build modules for the project. The central repository may be, for example, build data repository 150 that stores one or more versions of the shared build module associated with a particular platform that the plugin operates on. In some cases, project build module 124 can download the shared build module if a local copy of the shared build module is not stored on development system 120.

At step 330, project build module 124 builds the software development project based on a project configuration file and the downloaded shared build module. The project configuration file, as discussed above, may include information defining which optional features of the shared build platform are to be invoked during the build process, which modules to use during to build the software development project, and so on. At step 340, project build module 124 deploys the built software development project to debug and/or production systems. Whether project build module 124 deploys the software development project to a debug or a production system may be based, at least in part, on one or more properties defined in a build configuration file. In some cases, project build module 124 can temporarily store the built software development project (e.g., software plugin) until a time identified in the build configuration file, and at the identified time, transfer the built software development project to one or more debug or production systems (e.g., servers).

Figure 4:
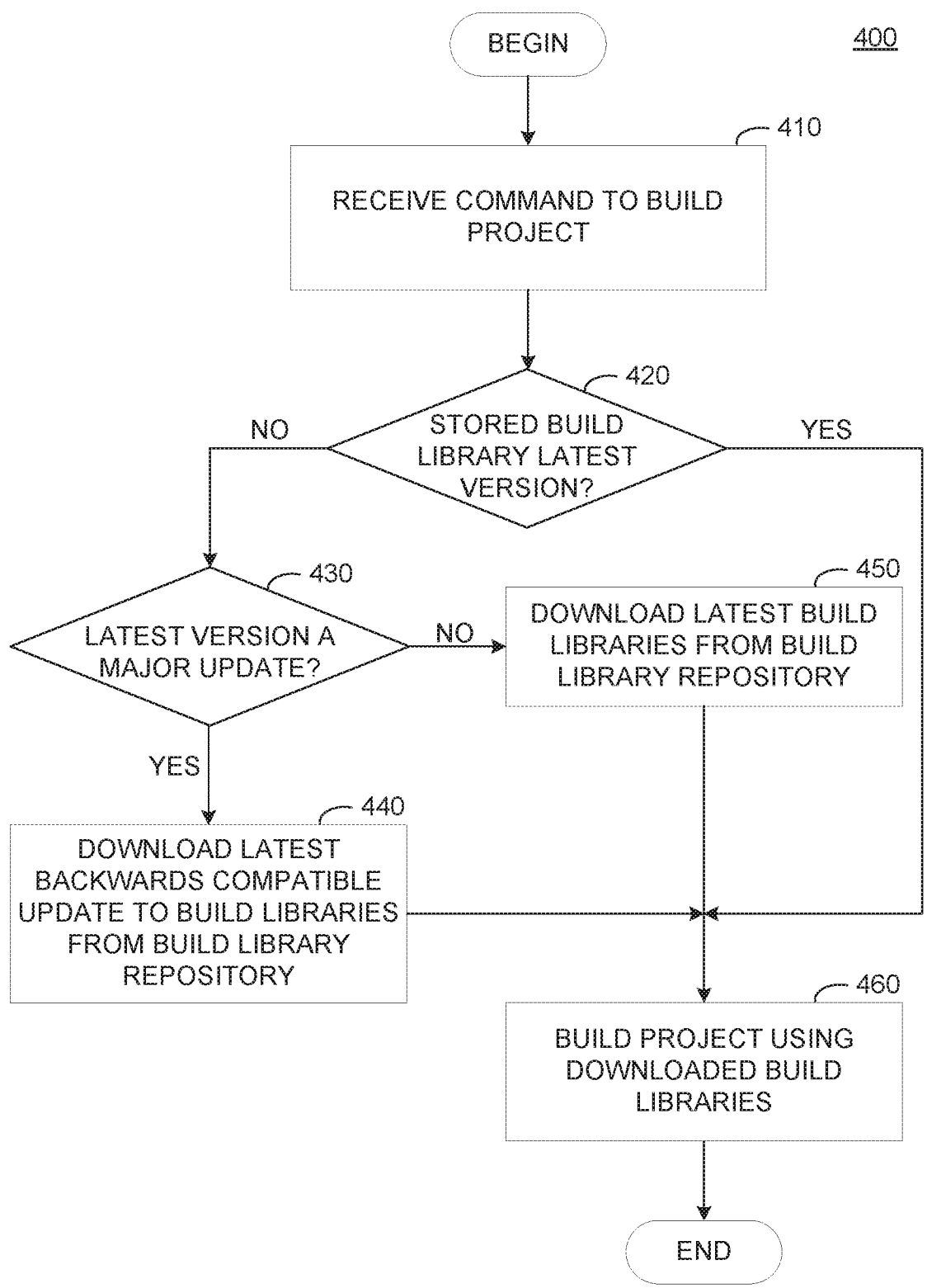
FIG. 4 illustrates an example method for determining a version of a shared build module to use in building a software development project, according to one embodiment.

FIG. 4 illustrates example operations 400 to update a version of the shared build module (e.g., to a major, minor, or patch update) used to build a software development project, according to an embodiment. Updating a version of the shared build module generally involves downloading a version of the shared build module from a central repository, which, as discussed above, may remove responsibility for maintaining and updating build code from plugin developers. These updates may ensure that different teams of developers that build plugins targeting the same software platform use the same (or substantially the same) build/deployment code. As illustrated, operations 400 begin at step 410, where project build module 124 receives a command to build a software development project (e.g., a plugin).

At step 420, project build module 124 determines whether the stored version of the shared build module is the latest version of the shared build module. To determine whether the version of the shared build module stored at development system 120 is the latest version of the shared build module, project build module 124 can query build data repository 150 for version information about the latest version of the shared build module for the software platform targeted by the software development project (plugin). If the version of shared build module stored at development system 120 matches the latest version of the shared build module available from build data repository 150, operations 400 proceed to step 460, where project build module 124 builds the software development project using the previously downloaded build modules available on development system 120.

If, however, a more recent version of the shared build module is available at build data repository 150, at step 430, project build module 124 determines if the latest version of the shared build module available at build data repository 150 a major update to the version of the shared build module stored on development system 120. If the latest version is a major update, at step 440, project build module 124 downloads the latest backwards compatible update to the shared build module from the build module repository (e.g., build data repository 150). A backwards compatible update may include a minor update that adds functionality to the project build module or a patch update that fixes functionality in the project build module. In some cases, project build module 124 need not replace the copy of the shared build modules stored on development system 120 with a copy from build data repository 150. In some cases, as discussed above, project build module 124 can notify a user of development system 120 that a major update to the shared build modules is available. The notification may include information about changes to the shared build modules relative to the downloaded version of the shared build modules and, if applicable, a date on which the major update to the software build modules will replace the version of the software build modules stored at development system 120. In some cases, project build module 124 may generate the notifications in a manner that requires a user of development system 120 to affirmatively acknowledge the notification before proceeding to step 460. After downloading the latest minor or patch update to the shared build modules (if needed), at step 460, project build module 124 builds the software development project using the downloaded shared build modules.

If, at step 430, the latest version information from build data repository 150 indicates that the shared build module available at build data repository 150 is a backwards compatible update (e.g., a minor or patch update) to the shared build module stored at development system 120, the operations proceed to step 450. At step 450, project build module 124 downloads the latest version of the shared build modules from the build module repository (e.g., build data repository 150). In some cases, project build module 124 may generate one or more notifications based on data associated with the updated shared build modules at build data repository 150. For example, the notifications may include information about changes to the shared build module. Because the updates to the shared build module may not include major changes to the functionality of the shared build module, project build module 124 may generate notifications to a user of development system 120 in a non-obtrusive manner (e.g., as an e-mail notification, a background notification in development environment 122, and so on). After downloading the updated shared build module from the build module repository, at step 460, project build module 124 builds the software development project using the downloaded shared build module.

Figure 5:
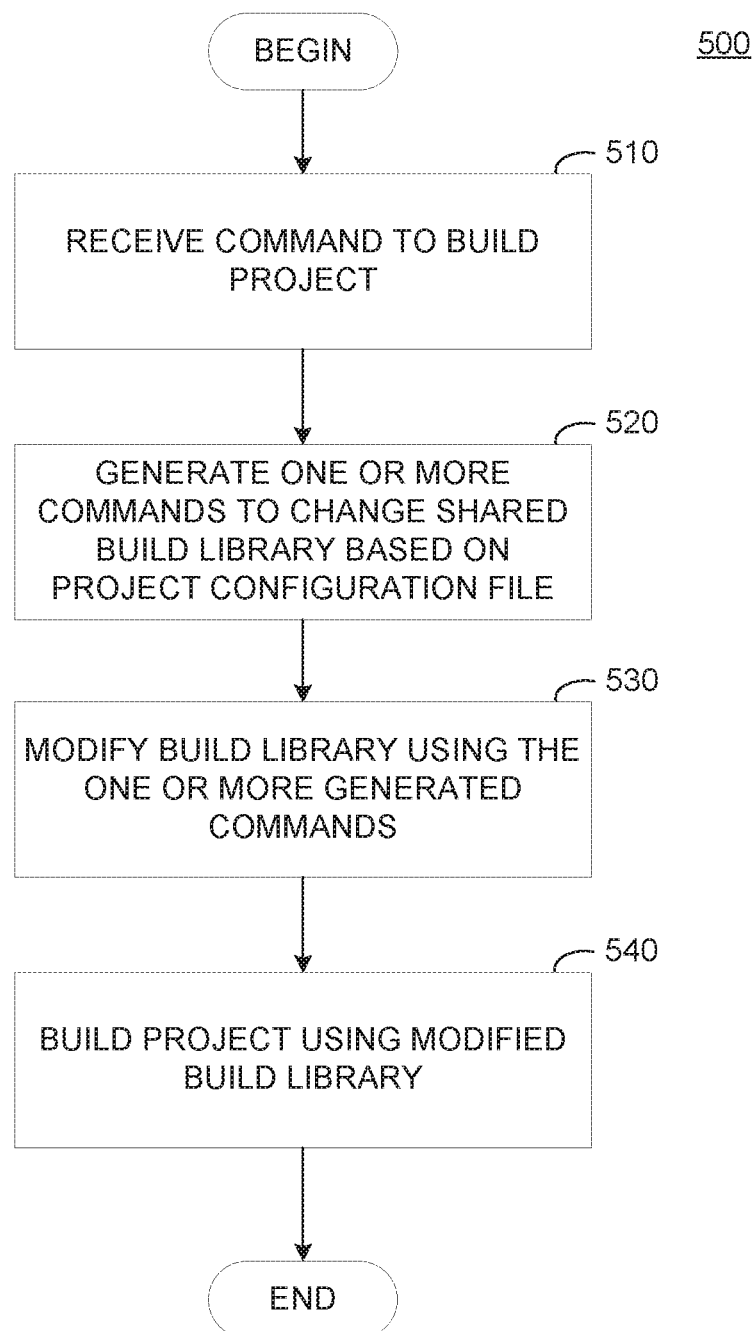
FIG. 5 illustrates an example method for modifying a shared build module for use in building a software development project, according to one embodiment.

FIG. 5 illustrates example operations 500 for customizing a shared build module for a specific software development project, according to an embodiment. Customizing a shared build module may change how the shared build module builds and deploys a software development project but may not change the underlying code base of the shared build module. As discussed herein, the underlying code base of the shared build module may remain consistent across different development teams that develop plugins for the same software platform. The underlying code base for the shared build module may be developed and maintained outside of any specific plugin development team, and the same build/deployment code may be deployed to different plugin development teams to maintain consistency in the build code used to build plugins targeting the same software platform. As illustrated, operations 500 begin at step 510, where project build module 124 receives a command to build a software development project.

At step 520, project build module 124 generates one or more commands to change the shared build module based on the project configuration file. As discussed above, the configuration files may include flags indicating whether optional features of the shared build module are to be used when building the software development project, flags indicating how the shared build module is to build the software development project (e.g., as a debug or release build), test suites to include in building the software development project, and so on.

At step 530, based on the generated commands, project build module 124 modifies the shared build module. The shared build module may include functions for modifying the functions of the shared build module. These functions may include mappings between parameters included in a configuration file and internal parameters in the shared build module. To modify the shared build module, project build module 124 may invoke one or more functions for modifying the shared build module with the appropriate parameters. In some cases, the functions may be structured as toggles to activate or deactivate optional features of the shared build module. In some cases, the functions may modify other build parameters, such as a threshold amount of code coverage for unit testing, test suites to be included in the build, and so on. After modifying the shared build module, at step 540, the project build module 124 builds the software development project using the modified build module. Based on parameters indicating whether the build process for the software development project is for building a version of the software development project for testing or production, project build module 124 can initiate one or more test or production servers and deploy the built version of the software development project to the appropriate servers.

Figure 6:
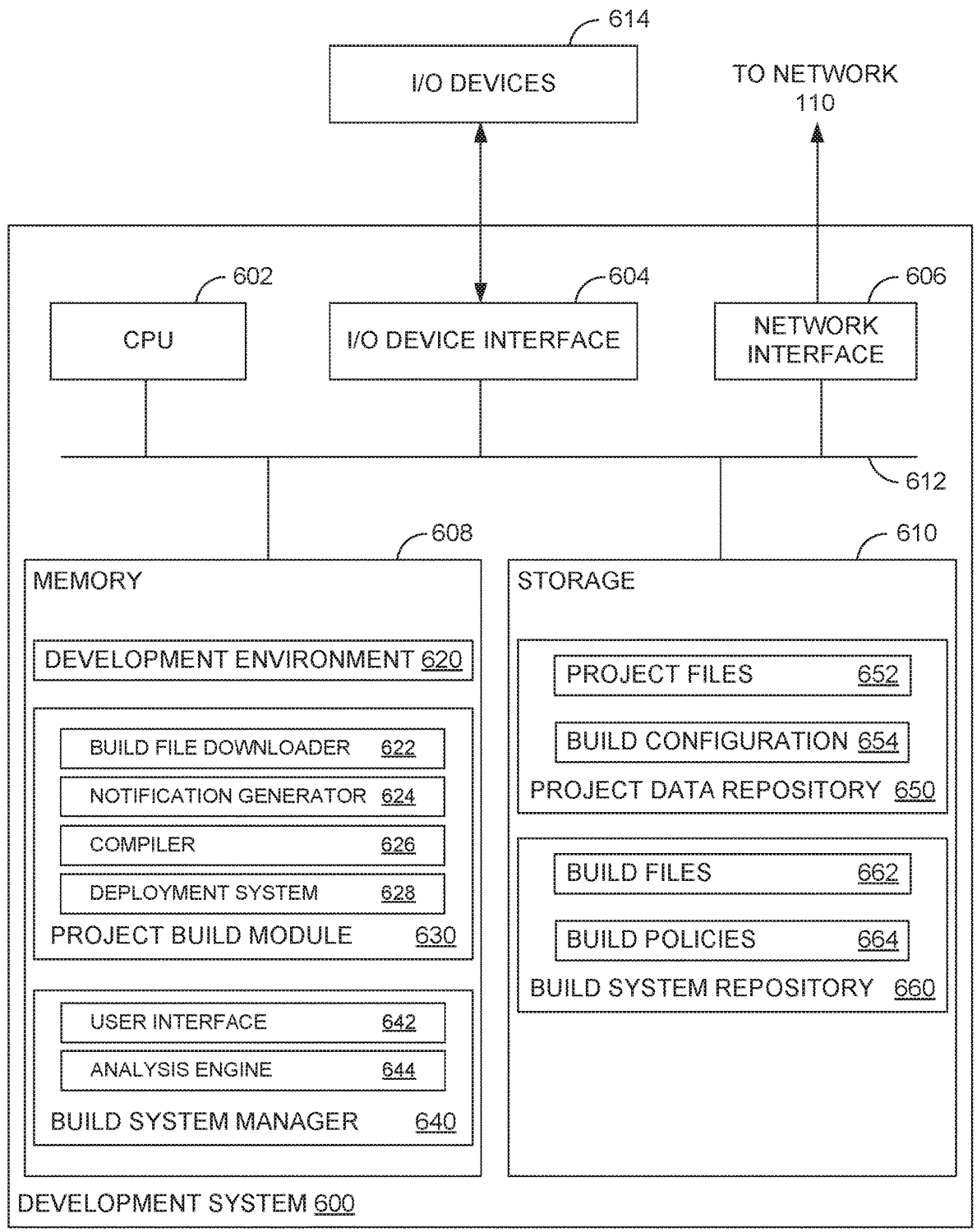
FIG. 6 illustrates an example computing system for building software development projects using a shared build module, according to one embodiment.

FIG. 6 illustrates an example development system that builds software development project (e.g., a plugin) using a shared build module common to developers targeting a specific software platform, according to an embodiment. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 generally includes development environment 620, project build module 630, and build system manager 640. Development environment 620 generally provides a graphical interface that a user of development system 600 can use to access, modify, and create source code files. Development system 600 may obtain source code files from a remote data repository (e.g., a remote versioning system) via network interface 606 or from a source code repository in storage 610.

As illustrated, project build module 630 generally includes a build file downloader 632, notification generator 634, compiler 636, and deployment system 638. A developer can initiate a project build and deployment process by invoking project build module 630 through development environment 620 or using a command line terminal. When project build module 630 begins a build process for a source code project, build file downloader 632 can compare the current version of the shared build module stored at development system 600 to the most recent version of the shared build module available from a centralized build file repository (e.g., build system repository 660 in storage 610 or from a remote system via network interface 606). If a version of the shared build module is not present on development system 600, build file downloader 632 can download the latest version of the shared build module from the centralized build file repository and build the software development project. Build file downloader 632 generally need not access the centralized build file repository if the current version of the shared build module matches the latest version of the shared build module available from the centralized build file repository. In such a case, build file downloader 632 can invoke compiler 636 to build the software development project for distribution on test and/or production servers, based on the configuration of the shared build module at development system 600.

When build file downloader 632 determines that a newer version of the shared build module is available at the centralized build file repository, build file downloader 632 can determine whether or not to download the shared build module based, at least in part, on whether the update is a major update or a minor update. For minor updates (e.g., updates that are backwards compatible with previous versions of the shared build module and fix bugs in a previous version of the shared build module or add limited new functionality to the shared build module), build file downloader 632 may automatically download the new version of the shared build module. In some cases, configuration parameters for project build module 630 may override the automatic download policy for minor updates.

If a major update to the shared build module is available, build file downloader 632 need not automatically download the updated shared build module. In some cases, where the update to the shared build module includes a countdown timer indicating an end-of-life date for previous versions of the shared build module, build file downloader 632 can download the major update to the shared build module if the current date is after the end-of-life date. Before the end-of-life date, build file downloader 632 need not automatically download the updated shared build module; in some cases, build file downloader 632 may transmit the end-of-life date to notification generator 634 to alert a user of development system 600 that a major update is available and will be downloaded after the end-of-life date.

When build file downloader 632 downloads an updated version of the shared build module from the centralized build file repository, notification generator 634 is generally configured to generate a notification to display changelog data associated with the updated version of the shared build module. Notification generator 634 can display notifications, for example, based on a policy associated with the update to the shared build module. For major updates, notification generator 634 may be configured to, for example, to display a message in a window that a user of development system 600 may be required to acknowledge in order to proceed with building the software. For minor updates, notification generator 634 need not generate a notification that requires user acknowledgment. As discussed above, notification generator 634 may, for example, generate a background notification for display in development environment 620, a message sent to one or more designated e-mail addresses, and so on. The notifications generated by notification generator 634 may include, for example, information from changelogs or update notes associated with an update to the shared build module.

Compiler 636 is generally configured to apply modifications to the shared build module based on build configuration files for the development project and generate a deployable version of the software development project. To modify the shared build module for a development project, compiler 636 can map parameter values in one or more build configuration files to internal parameters in the shared build module. These parameters may include, for example, toggles to activate (or deactivate) optional parameters to be used by the shared build module in building the software development project, which test suites are to be used in a debug build of the software development project, and so on. Upon modifying the shared build module according to the configuration files for the software development project, compiler 636 builds the software development project using the shared build module.

Deployment system 638 generally receives a compiled or built version of the software development project (e.g., a plugin) and deploys the built project to one or more test/debug or production servers. Deployment system 638 may determine whether to deploy the built project to a set of debug or production servers based, for example, on configuration information in a build file indicating if compiler 636 built the project with debug flags or test code enabled. In some cases, deployment system 638 can temporarily store the built project on development system 600 until time at which the project is to go live on a production system.

Build system manager 640 generally allows a user of development system 600 to manage the shared build modules used by multiple development teams to build software development projects (e.g., plugins) for a common software platform. As illustrated, build system manager 640 generally includes a user interface 642 and an analysis engine 644. User interface 642 generally provides an interface for a user of development system 600 to upload a new version of the shared build module to a build module repository. When a developer uploads a new version of the shared build module to a build module repository, the developer can indicate, through user interface 642, whether the new version is a major update or a minor update to the shared build module. The developer can further upload release notes, such as a change log or update notes relative to a previous version of the shared build module, flags indicating whether the update is a mandatory update or an optional update, an end-of-life date for a previous version of the shared build module, and so on.

Analysis engine 644 is generally configured to receive statistical data about software development projects from one or more development systems (e.g., local development system 600 and/or one or more remote systems, via network connection 606). The statistical data may include, for example, data gathered about API usage, errors generated by specific APIs or function calls, and so on. Based on the gathered statistical data, analysis engine 644 can generate reports that developers can use to focus development of the shared build module and/or APIs that, for example, are a common source of errors across different development projects.

As shown, storage 610 includes a project data repository 650 and a build system repository 660. Project data repository 650 is generally configured to store source code for a software development project for access by developers using development system 600 or from remote users interacting with development system 600 via network interface 606. As illustrated, project data repository 650 generally includes project files 652 and build configuration 654. Project files 652 generally include the source code components associated with a development project. The source code components associated with a development project can be stored in a version control system that serves as a centralized repository for the project source code. Developers (using development system 600 or a remote system connected to development system 600 via network interface 606) can access, edit, and commit new versions of the source code to project files 653, and as versions of the development project are built, project files 652 can include snapshots of the current state of the project source code associated with each major test build or production build of the source code.

Build configuration 654 generally include one or more configuration files used by the project build module 630 to generate testing and/or production builds of a software development project. The configuration files may include parameters defining, for example, data identifying one or more systems to deploy the built version of the software development project, an indication of whether the project build module 630 is to build a debug or production version of the software development project, and optional parameters that project build module 630 is to use when building the software development project. In some cases, the configuration files may identify tests that are to be included in a debug/testing build of the software development project, a minimum level of code to be covered by unit tests in a debug build of the software development project, and so on.

Build system repository 660 is generally configured to store versions of the shared build module for use by development system 600 and one or more remote systems (accessible through network connection 606) in building debug and/or production versions of various software development projects targeting the same parent application (e.g., plugins for a particular application). As illustrated, build system repository 660 generally includes build files 662 and build policies 664.

Build files 662 generally include one or more versions of the shared build module. The different versions of the shared build module may be stored in a version repository. Each version of the shared build module stored in build files 662 may be accompanied by, for example, a change log or update notes relative to a previous version of the shared build module.

Build policies 664 generally include one or more update policies associated with each version of the shared build module. For minor updates to the shared build module, build policies 664 may indicate whether the update is an optional update (e.g., adds optional features to the shared build module but does not break existing functionality or fix expected functionality in the shared build module). If the update is a mandatory update (e.g., fixes the expected functionality of the shared build module, introduces fixes to security issues, and so on), build policies 664 can indicate, for example, an end-of-life date for previous versions of the shared build module.

While the foregoing is directed to embodiments of the present disclosure, other and further embodiments of the disclosure may be devised without departing from the basic scope thereof, and the scope thereof is determined by the claims that follow.

What is claimed is:

1. A method for building a software development project, comprising:
receiving a request to build a software development project;

obtaining, from a centralized repository, an updated version of a shared build module including one or more new features relative to a shared build module; and upon obtaining the updated version of the shared build module:

identifying the one or more new features by comparing features of the shared build module to features of the updated version of the shared build module, and automatically updating a configuration of the shared build module to deactivate the one or more new features;

evaluating a configuration file for the shared build module for one or more build parameters, wherein:

the one or more build parameters specify one or more modifications to apply to the shared build module relative to a default configuration of the shared build module, and the one or more build parameters comprise:

an identification of one or more test suites to include in building the software development project, and information identifying a date and time at which a build of the software development project can be deployed to a production environment;

modifying the shared build module, based on mappings between build parameters in the configuration file and internal parameters in the shared build module, to override the default configuration of the shared build module;

building the software development project using the modified shared build module;

executing the identified one or more test suites against the built software development project; and deploying the built software development project to the production environment at the identified date and time.

2. The method of claim 1, further comprising:

determining that the configuration file does not include values for each of one or more required parameters for building the software development project using the shared build module; and halting a build process for the software development project.

3. The method of claim 2, further comprising: generating a notification identifying the one or more build parameters that are not included in the configuration file.

4. The method of claim 1, wherein the one or more build parameters include data identifying a destination for the built software development project.

5. The method of claim 1, wherein modifying operating parameters for the shared build module based on the build parameters in the configuration file comprises using a default setting in the shared build module for parameters without a value in the configuration file.

6. The method of claim 1, further comprising:

based on one or more parameters in the configuration file, determining whether the built software development project is a test version or a production version of the software development project; and deploying the built software development project to one or more servers based on the determination.

7. A non-transitory computer-readable medium comprising instructions which, when executed by one or more processors, performs an operation for building a software development project, the operation comprising:

receiving a request to build a software development project;

obtaining, from a centralized repository, an updated version of a shared build module including one or more new features relative to a shared build module; and upon obtaining the updated version of the shared build module:

identifying the one or more new features by comparing features of the shared build module to features of the updated version of the shared build module, and automatically updating a configuration of the shared build module to deactivate the one or more new features;

evaluating a configuration file for the shared build module for one or more build parameters, wherein:

the build parameters specify one or more modifications to apply to the shared build module relative to a default configuration of the shared build module, and the build parameters comprise:

an identification of one or more test suites to include in building the software development project, and information identifying a date and time at which a build of the software development project can be deployed to a production environment;

modifying the shared build module, based on mappings between build parameters in the configuration file and internal parameters in the shared build module, to override the default configuration of the shared build module; and building the software development project using the modified shared build module;

executing the identified one or more test suites against the built software development project; and deploying the built software development project to the production environment at the identified date and time.

8. The non-transitory computer-readable medium of claim 7, wherein the operation further comprises:

determining that the configuration file does not include values for each of one or more required parameters for building the software development project using the shared build module; and halting a build process for the software development project.

9. The non-transitory computer-readable medium of claim 7, wherein the one or more build parameters include data identifying a destination for the built software development project.

10. The non-transitory computer-readable medium of claim 7, wherein modifying operating parameters for the shared build module based on the build parameters in the configuration file comprises using a default setting in the shared build module for parameters without a value in the configuration file.

11. The non-transitory computer-readable medium of claim 7, wherein the operation further comprises:

based on one or more parameters in the configuration file, determining whether the built software development project is a test version or a production version of the software development project; and deploying the built software development project to one or more servers based on the determination.

12. A system, comprising:

a processor; and a memory comprising instructions which, when executed on the processor, perform an operation for building a software development project, the operation comprising:

receiving a request to build a software development project;

obtaining, from a centralized repository, an updated version of a shared build module including one or more new features relative to a shared build module; and upon obtaining the updated version of the shared build module:
- identifying the one or more new features by comparing features of the shared build module to features of the updated version of the shared build module, and
- automatically updating a configuration of the shared build module to deactivate the one or more new features;

evaluating a configuration file for the shared build module for one or more build parameters, wherein:
- the build parameters specify one or more modifications to apply to the shared build module relative to a default configuration of the shared build module, and
- the build parameters comprise,
  - an identification of one or more test suites to include in building the software development project, and
  - information identifying a date and time at which a build of the software development project can be deployed to a production environment;

modifying the shared build module, based on mappings between parameters in the configuration file and internal parameters in the shared build module, to override the default configuration of the shared build module;

building the software development project using the modified shared build module; and executing the identified one or more test suites against the built software development project; and deploying the built software development project to the production environment at the identified date and time.

13. The system of claim 12, wherein the operation further comprises:
- determining that the configuration file does not include values for each of one or more required parameters for building the software development project using the shared build module; and
- halting a build process for the software development project.

14. The system of claim 13, wherein the operation further comprises: generating a notification identifying the one or more build parameters that are not included in the configuration file.

15. The system of claim 12, wherein the one or more build parameters include data identifying a destination for the built software development project.

16. The system of claim 12, wherein modifying operating parameters for the shared build module based on the build parameters in the configuration file comprises using a default setting in the shared build module for parameters without a value in the configuration file.

17. The system of claim 12, wherein the operation further comprises:
- based on one or more parameters in the configuration file, determining whether the built software development project is a test version or a production version of the software development project; and
- deploying the built software development project to one or more servers based on the determination.

* * * * *